(12) United States Patent
Dumitriu

(10) Patent No.: US 6,337,943 B1
(45) Date of Patent: *Jan. 8, 2002

(54) RIBBON FIBRE FIXATING DEVICE

(75) Inventor: Ion Dumitriu, Nynäshamn (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,308

(22) Filed: Dec. 18, 1998

(30) Foreign Application Priority Data

Dec. 19, 1997 (SE) ................................. 9704765

(51) Int. Cl.[7] .............................. G02B 6/00; C03B 37/16
(52) U.S. Cl. ............................ 385/137; 225/2; 225/96.5
(58) Field of Search ................................. 385/137, 134, 385/135, 136; 225/2, 96.5

(56) References Cited

U.S. PATENT DOCUMENTS

| | | | |
|---|---|---|---|
| 4,146,374 A | * 3/1979 | van Hoppe | ..................... 225/2 |
| 4,202,475 A | * 5/1980 | Hiari et al. | ..................... 225/2 |
| 5,106,006 A | 4/1992 | Suda et al. | |
| 5,121,866 A | * 6/1992 | Hakoun et al. | ............ 225/96.5 |
| 5,312,468 A | 5/1994 | Yin et al. | |
| 5,524,167 A | 6/1996 | Ewert et al. | |
| 5,631,985 A | * 5/1997 | Yamada et al. | ................ 385/59 |

FOREIGN PATENT DOCUMENTS

EP   0 618 466 A2   10/1994

* cited by examiner

*Primary Examiner*—Hemang Sanghavi
(74) *Attorney, Agent, or Firm*—Burns, Doane, Swecker & Mathis, L.L.P.

(57) ABSTRACT

A device is for fixating a fiber ribbon cable in a ribbon fiber cutting machine. A fixture or jig holding a stripped fiber ribbon cable is placed on the cutting machine in a predetermined position, by placing the jig in a machine-mounted holder and pressing the jig against one side thereof. The jig is positioned so that the ribbon fibers will enter respective V-grooves on a first support and engage a resilient surface on a second support. The fibers can be linearised in the grooves on said support surface, despite possibly being deformed when stripping the cable, by angling the jig in relation to said V-grooves on said support surface. The fibers are pressed down into the grooves, thereby fixating the fibers in both a vertical and a lateral direction. The fibers will also be parallel with one another in the space between said support. Arranged in said space is a knife by means of which a fracture line or weakening is made on the fibers. A weight is then caused to drop onto the fibers, so as to exert force at the fracture lines or weakenings.

9 Claims, 2 Drawing Sheets

RIBBON FIBRE FIXATING DEVICE

FIELD OF INVENTION

The present invention relates to a device for fixating optical fibres in an optical fibre ribbon cable when cutting the fibres in said cable.

DESCRIPTION OF THE BACKGROUND ART

The same principle applied when cutting glass is also applied in present-day optical fibre cutting machines, where a shallow groove or score line is made in the surface of the glass and the glass then broken off along the score line. Cutting machines may be constructed in three different ways, as described below:

Alternative a). An optofibre is clamped between two clamps and a fracture line is then made on the fibre transversely to the fibre direction, wherewith the fibre breaks off as a result of the mechanical tension present in the fibre.

Alternative b). An optofibre is placed on a hard supporting surface in the absence of any tension. A fracture line, or weakening, is then made on the fibre transversely to the fibre direction and a specific pressure is applied to said fracture line or weakening, so as to break off the fibre.

Alternative c). A knife is placed on an optofibre transversely to its fibre direction, wherewith the fibre is severed by pressing the knife thereagainst.

Any one of these methods can be used in the construction of an optofibre cutting machine. Each method has advantages and disadvantages that must be balanced against one another when constructing a new cutting machine. Optic fibre ribbon cable cutting machines are almost always constructed in accordance with alternative b). When cutting optical fibres in the form of optic fibre ribbon cables, it is important that the length of the separated fibres do not differ from one another to any great extent, and that the fibre cutting angle is not over excessive.

U.S. Pat. No. 5,106,006 describes a method of fixating and cutting the fibres of a fibre ribbon cable, where the fibres are placed between two supports. These supports consist of two parts and the fibres are placed between respective parts. Each part includes a rubber surface which is placed against the fibres so as to hold the fibres in a fixed vertical and lateral position. Mounted in the space between the supports is a knife that acts on the fibres to make a fracture line or weakening. A weight is then dropped down onto the fibres and a force applied at the fracture line. The length and the angle of each individual fibre will depend on the configuration or appearance of the fracture line; depth and position Since the knife is located at a predetermined level in relation to the optofibres, the fibres must be positioned at one and the same level each time a cut is made. The aforedescribed method will function satisfactorily provided that the rubber surfaces are not worn and that they still have their initial resilience. If the rubber surfaces become excessively worn, the optofibres will be positioned at slightly different levels.

The plastic jacket around the fibre is normally stripped by a method referred to as hot jacket removing. This involves heating the plastic jacket and then cutting the jacket with the aid of two knives whilst pulling the jacket from the fibres at the same time. Because the plastic jacket is deformed as it is drawn out by the knives, the exposed fibres will not be parallel with one another, but will be splayed in all directions. The fibres will thus present different angles to the knife in the cutting machine, and will therefore be cut at mutually different lengths and cutting angles. The lengths of respective fibres will thus vary slightly, since the device used includes no means for guiding the fibres automatically and therewith bring the fibres perpendicular to the knife during cutting of the fibres.

U.S. Pat. No. 5,312,468 teaches a method in which a fibre ribbon cable is placed between two supports and the supports then displaced relative to each other. By following this procedure prior to making a fracture line or weakening with the aid of a knife, it is possible to obtain a specific cutting angle. Fixation of the fibres in respective supports can be effected with the aid of v-grooves, among other things.

SUMMARY OF THE INVENTION

The problem with present-day cutting machines is that the difference in length between severed fibres in an optic fibre ribbon cable is too great and that the cutting angle can vary. This makes satisfactory splicing of two fibre ribbon cables difficult to achieve. The result is often a poor splice, or join, with particularly uneven splice attenuating values.

The present invention addresses a problem as to how a fracture line in each individual fibre of an optic fibre ribbon cable can be given mutually the same depth, by fixating the fibres vertically.

Another problem addressed by the invention is one of positioning the fibres of an optic fibre ribbon cable parallel with one another, so that a right angle will be obtained between each individual fibre and a cutting tool that has made said fracture line.

An object of the present invention is thus to provide conditions which will enable fibres in an optic fibre ribbon cable to be cut so that each individual fibre will have the same length as the other fibres and present the smallest possible cutting angle.

Subsequent to exposing the fibres of a fibre ribbon cable, the cable is placed in a fixture or jig, which is preferably self-centering so that the ribbon cable will always be centred around a specific centre line. The jig is mounted on the cutting machine in a predetermined position, by placing the jig in a machine-mounted holder and pressed against one side of said holder. The fibres of the ribbon cable are placed between two supports. These supports consist of two parts and the fibres are placed between respective parts. The bottom part, which lies proximal to the jig, has a non-resilient surface that includes V-shaped recesses or grooves, whilst the upper part includes a resilient surface. The other support consists of two similar parts, including a resilient surface.

The jig is positioned so that the fibres will be located in the grooves on the first support and on the resilient surface on the second support. The fibres can be positioned linearly in the grooves, despite possibly being deformed during the process of stripping the plastic covering, by angling the jig in relation to the surface containing said grooves. The upper parts of said supports press the fibres down into the V-grooves, therewith fixing the fibres both vertically and laterally. The fibres will also be held in mutual parallel relationship in the space between said supports. A fracture line, or weakening, is made on the fibres with the aid of a knife mounted in the space between said supports. A weight is then dropped down onto the f fibres so as to apply a force at the fracture line.

One advantage afforded by the invention is that the fibres can be caused to extend linearly in relation to one another automatically, by placing the jig in a predetermined position and introducing an angle between the grooved surface and said jig.

The invention will now be described in more detail with reference to preferred embodiments thereof and also with reference to the accompanying drawings.

DESCRIPTION OF PREFERRED EMBODIMENTS

Figure 1:
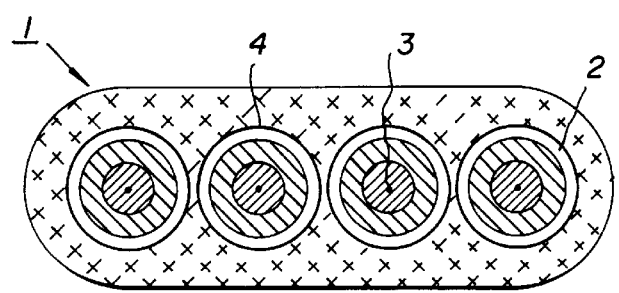
FIG. 1 is a cross-sectional view of a fibre ribbon cable.

FIG. 1 is a cross-sectional view of an optical fibre ribbon cable 1 that includes four optic fibres 2. A fibre includes a doped glass core 3, which is surrounded by a number of layers. These layers function to protect the fibre and to reflect light signals into said fibre. The outermost layer 4 is used to colour-code the fibre. Although the fibre ribbon cable is shown to contain four fibres, commercially available fibre ribbon cables may contain up to twelve fibres.

Figure 2:
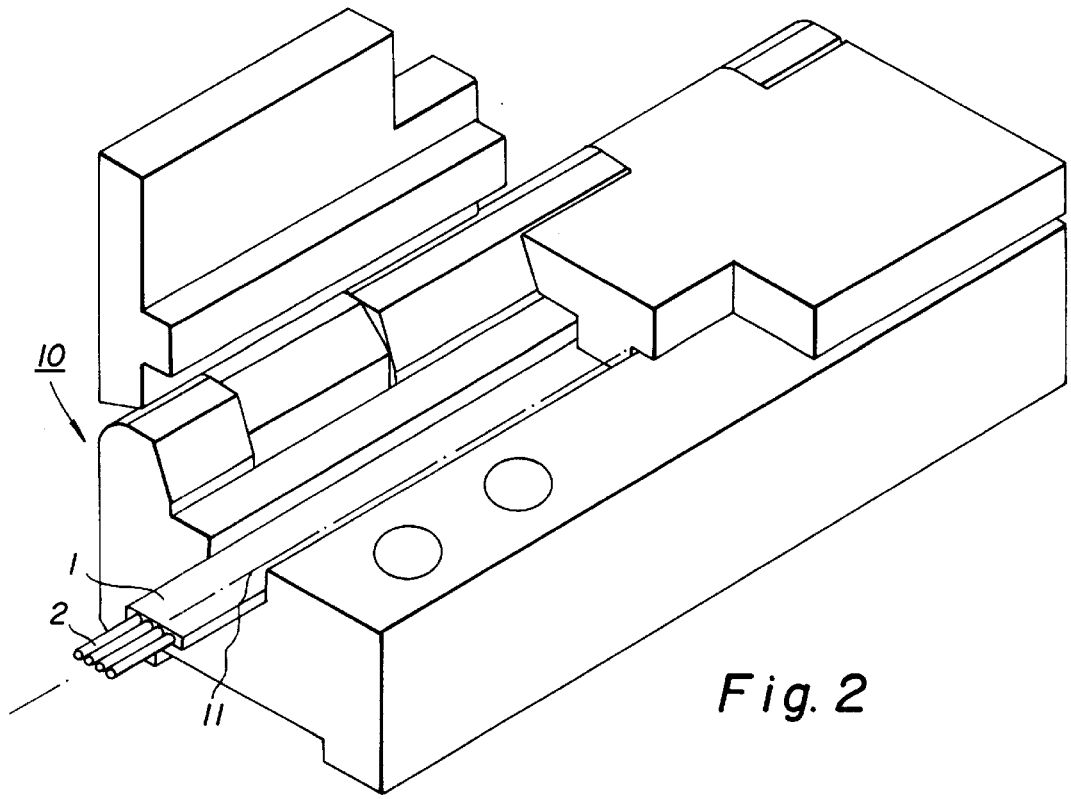
FIG. 2 illustrates a self-centering fixture or jig for fibre ribbon cables.

FIG. 2 illustrates a self-centering fixture or jig 10 which will automatically centre a fibre ribbon cable about the centre line 11 thereof when a cable is placed therein.

Figure 3A:
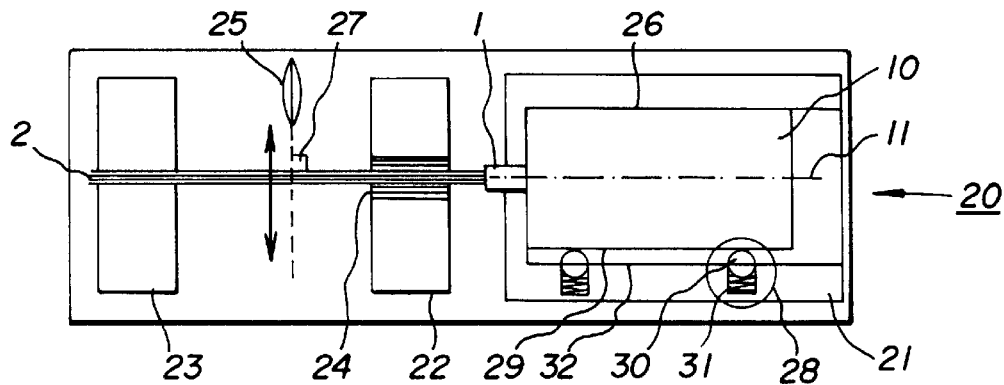
FIGS. 3a–3b illustrate a cutting machine that includes a fixating device according to the invention, from above.

FIG. 3a illustrates from above a cutting machine 20 that includes a fixating device according to the invention. The machine includes a holder 21 for fixating the jig 10 and associated ribbon cable 1 having fibres 2. The cutting machine also includes two supports, each of which consists of two parts. The Figure shows only the bottom parts of the supports, of which a first bottom part 22 includes a surface that contains V-grooves 24 which function to position the fibres 2 linearly in relation to each other. A second bottom part 23 includes a resilient surface. Arranged between the supports is a knife 25 which functions to make fracture lines or weakenings on the fibres 2. The jig 10 is fixed by pressing it against one side 26 of a holder, said side functioning as a reference edge. Thus, when the jig lies against the reference edge 26, the fibres 2 and the knife 25 will define a right angle 27 with one another. The V-grooves 24 are positioned so as to lie centred around the jig centre line 11 when the jig 10 lies against the reference edge 26. The jig 10 is pressed against the reference edge 26 by at least one spring-loaded element 28 mounted on the opposite side 29 of said jig. The spring loaded element may, for instance, comprise a ball 30 with an underlying spring 31 incorporated in the opposing side 32 of the holder 21 on the cutting machine 20.

Figure 3B:
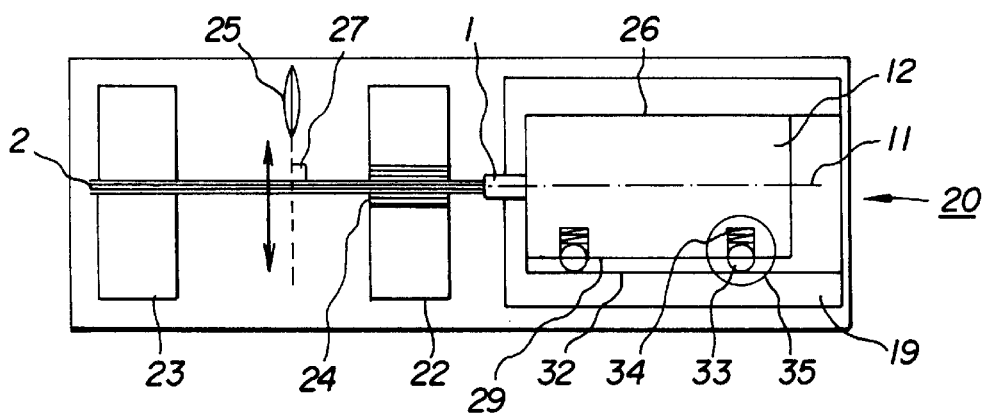

FIG. 3b illustrates from above an alternative embodiment of a holder 19 and a jig 12 according to the invention. The jig 12 includes a spring-loaded element 35, such as a ball 33 and underlying spring 34 incorporated in the opposite side 29 of arranged on the opposite to the side 32 of the holder.

Figure 4A:
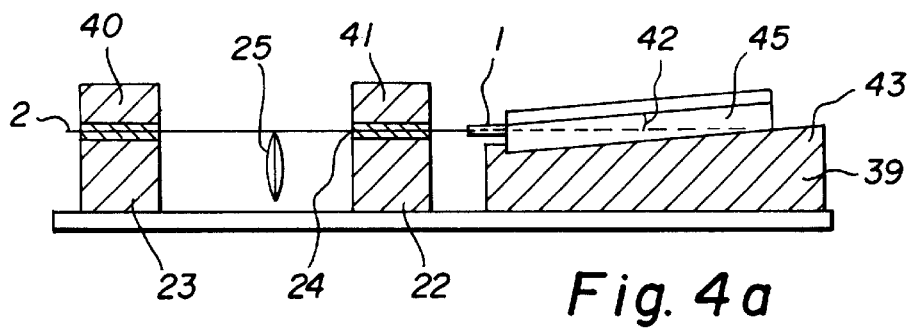
FIGS. 4a–4b are side views of a cutting machine that includes a angled jig or fixture according to the invention.

FIG. 4a is a cross-sectional view of a cutting machine 20 provided with an angled holder 39. The Figure also shows the upper part 40, 41 of respective supports by means of which the fibres 2 are held fixed in position as the knife 25 makes said fracture lines. As clearly shown in the Figure, the fibre ribbon cable is held in the jig at an angle 42 to the V-grooves 24. This angle 42 facilitates linearisation of the fibres 2, when a standard jig 45 is placed in the holder 39 against an angled abutment surface 43.

Figure 4B:
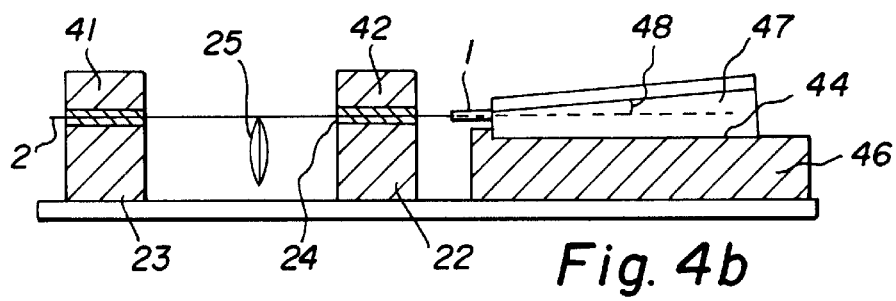

FIG. 4b is a cross-sectional view of an alternative embodiment of a cutting machine 20 that has a straight holder 46 and where the abutment surface 44 against an angled jig 47 is parallel with the surface containing said V-grooves 24. By incorporating the angle 48 in the jig 47, existing cutting machines can be readily used without needing to be modified.

Combinations of the aforedescribed embodiments may, of course, be made.

It will be understood that the invention is not restricted to the aforedescribed and illustrated exemplifying embodiments thereof, and that modifications can be made within the scope of the following claims.

What is claimed is:

1. A device for fixating the fibres of a fibre ribbon cable in a cutting machine that includes a holder, two supports, and a fibre cutting knife, wherewith the fibre ribbon cable is placed in a jig positioned on a top surface of the holder on the cutting machine, so that the fibres will be perpendicular to the knife and fixed between said supports, of which at least one has a V-grooved surface, and jig pressing means for sidewardly pressing the jig against one side surface of the holder.

2. A device according to claim 1, wherein the jig pressing means comprises at least one spring-loaded element, including a ball and underlying spring in that side of the jig that acts against another side surface of the holder.

3. A device according to claim 1, wherein the jig pressing means comprises at least one spring-loaded element, including a ball and underlying spring in another side surface of the holder which acts against one side of the jig.

4. A device according to claim 1, wherein said jig pressing means is adapted to angle the jig in relation to said surface containing the V-grooves.

5. A device according to claim 4, wherein the jig has an angled abutment surface co-acting with the holder.

6. A device according to claim 4, wherein the holder has an angled abutment surface that co-acts with the jig.

7. A device according to claim 1, wherein the one side surface of the holder functioning as a reference edge.

8. A device according to claim 1, wherein the jig is pressed against the one side surface of the holder by at least one spring-loaded element mounted on a side of the jig which is opposite to the one side surface of the holder.

9. A device according to claim 1, wherein the jig is pressed against the one side surface of the holder by at least one spring-loaded element which is mount on an opposite side surface of the holder.

* * * * *